United States Patent
Pakala et al.

(10) Patent No.: US 8,611,055 B1
(45) Date of Patent: Dec. 17, 2013

(54) MAGNETIC ETCH-STOP LAYER FOR MAGNETORESISTIVE READ HEADS

(75) Inventors: Mahendra Pakala, Fremont, CA (US);
Rongfu Xiao, Fremont, CA (US);
Chando Park, Palo Alto, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 986 days.

(21) Appl. No.: 12/534,091

(22) Filed: Jul. 31, 2009

(51) Int. Cl.
*G11B 5/33* (2006.01)

(52) U.S. Cl.
USPC ........................................... 360/324.2

(58) Field of Classification Search
None
See application file for complete search history.

(56) References Cited

U.S. PATENT DOCUMENTS

| | | | |
|---|---|---|---|
| 5,587,026 A | 12/1996 | Iwasaki et al. | |
| 5,731,936 A | 3/1998 | Lee et al. | |
| 5,796,560 A | 8/1998 | Saito et al. | |
| 5,955,211 A | 9/1999 | Maeda et al. | |
| 6,278,592 B1 | 8/2001 | Xue et al. | |
| 6,411,476 B1 | 6/2002 | Lin et al. | |
| 6,560,078 B1 | 5/2003 | Pinarbasi | |
| 6,592,725 B2 | 7/2003 | Lin et al. | |
| 6,788,499 B2 | 9/2004 | Lin et al. | |
| 6,961,224 B2 | 11/2005 | Pinarbasi | |
| 6,993,827 B2 | 2/2006 | Horng et al. | |
| 7,060,194 B2 | 6/2006 | Kodaira et al. | |
| 7,067,331 B2 | 6/2006 | Slaughter et al. | |
| 7,111,385 B2 | 9/2006 | Chau et al. | |
| 7,352,543 B2 | 4/2008 | Li et al. | |
| 7,355,823 B2 | 4/2008 | Li et al. | |
| 7,367,109 B2 | 5/2008 | Li et al. | |
| 7,382,587 B2 | 6/2008 | Pinarbasi | |
| 7,420,788 B2 | 9/2008 | Pinarbasi | |
| 7,476,954 B2 | 1/2009 | Wang et al. | |
| 2002/0015268 A1 | 2/2002 | Mao et al. | |
| 2002/0023338 A1* | 2/2002 | Seigler et al. | 29/603.15 |
| 2004/0214049 A1 | 10/2004 | Yamamoto et al. | |
| 2007/0030724 A1 | 2/2007 | Hosomi et al. | |
| 2007/0063237 A1 | 3/2007 | Huai et al. | |
| 2007/0146928 A1 | 6/2007 | Zhang et al. | |
| 2007/0206335 A1 | 9/2007 | Freitag et al. | |
| 2008/0090307 A1 | 4/2008 | Xiao et al. | |
| 2008/0213628 A1 | 9/2008 | Hailu et al. | |

* cited by examiner

*Primary Examiner* — David D Davis

(57) ABSTRACT

A method of producing a magnetoresistive read head and a tunneling magnetoresistive read head produced thereby are disclosed. A shield layer is provided. A magnetic etch-stop layer is formed over the shield layer, where the magnetic etch-stop layer comprises a nonmagnetic metal and a soft magnetic material with overall property still being magnetically soft. A sensor stack is formed over the magnetic etch-stop layer. A patterned mask layer is formed over the sensor stack. Material from a portion of the sensor stack not covered by the patterned mask is removed.

11 Claims, 5 Drawing Sheets

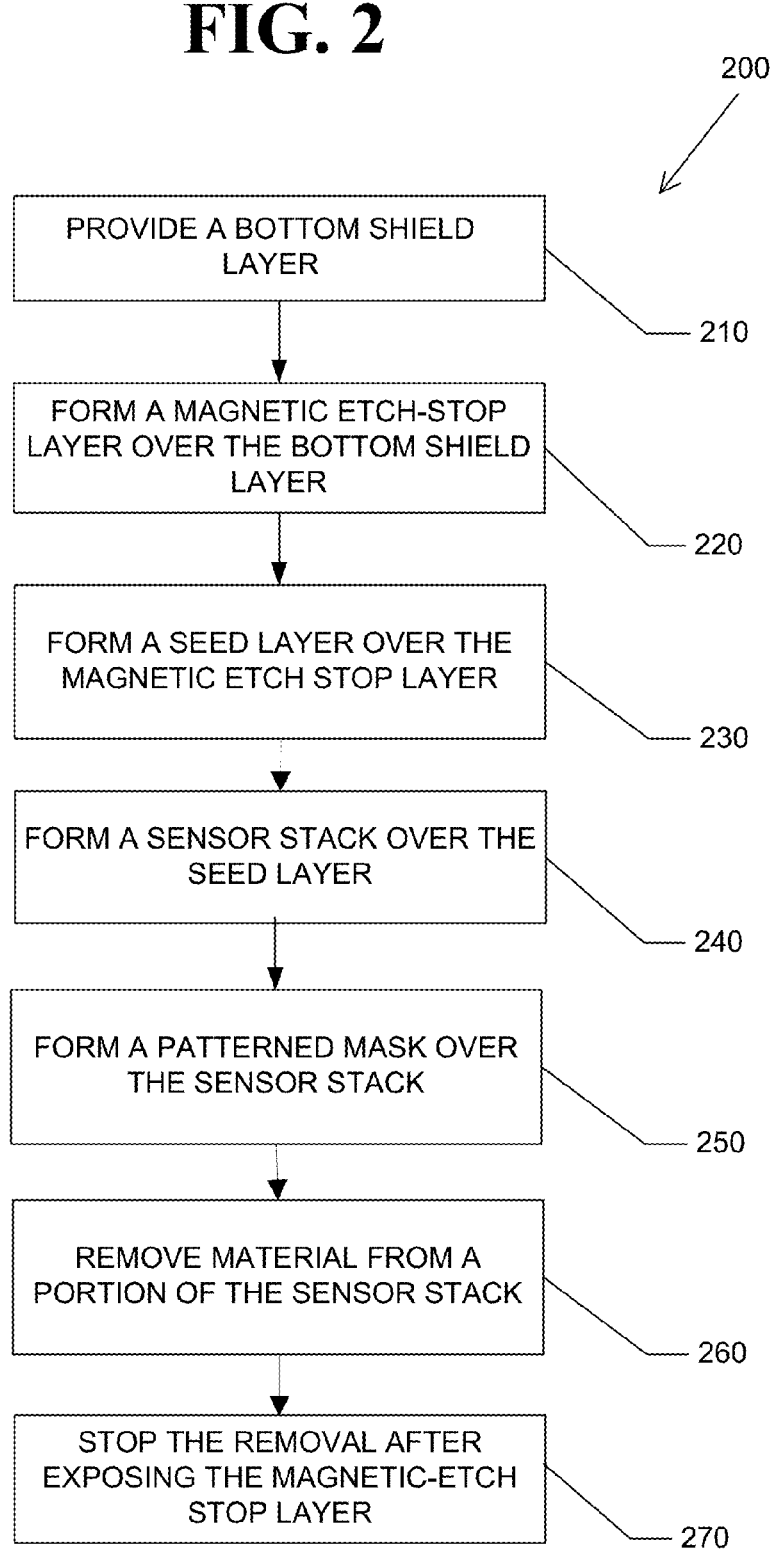

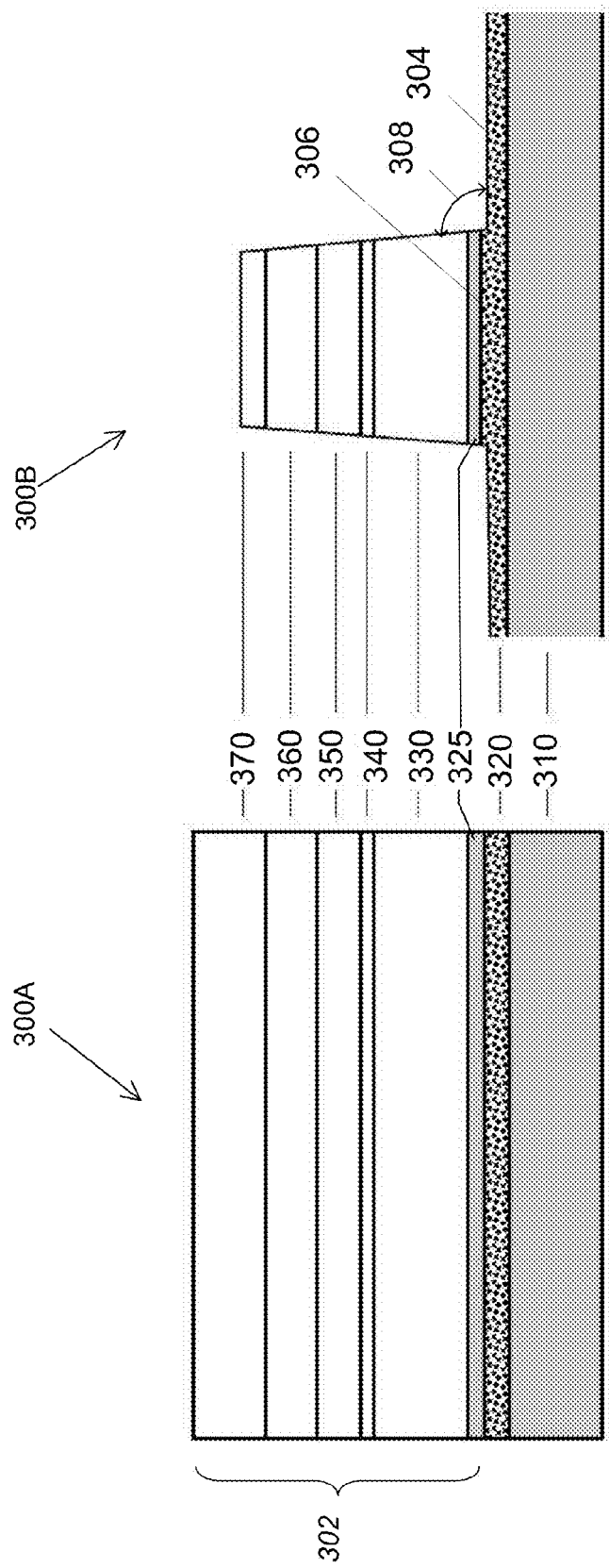

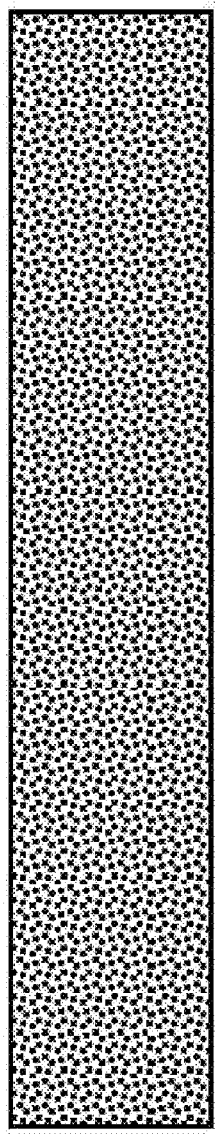
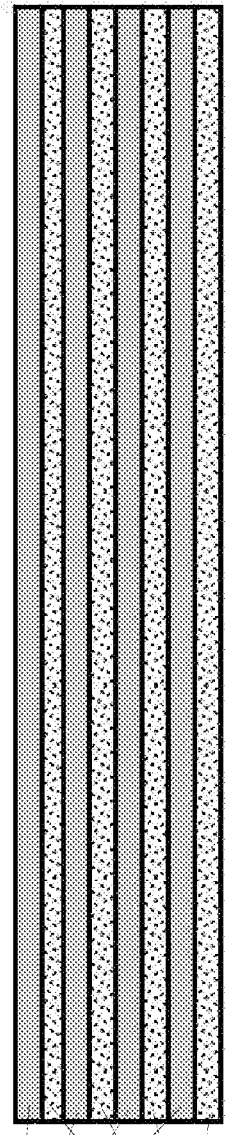

MAGNETIC ETCH-STOP LAYER FOR MAGNETORESISTIVE READ HEADS

FIELD OF THE INVENTION

The present invention generally relates to magnetoresistive read heads and, in particular, relates to magnetic etch-stop layer for magnetoresistive read heads.

BACKGROUND OF THE INVENTION

Magnetoresistive sensors such as tunnel magnetoresistance (TMR) sensors and giant magnetoresistance (GMR) sensors are frequently employed as sensing elements in the magnetic read heads of hard disk drives. As the areal density of hard disks approaches 1 $Tb/in^2$, the size of read head shrinks in all three dimensions: track width (TW), shield-to-shield spacing, and stripe height. In current fabrication processes for magnetic read heads, an ion-beam-etch (IBE) process is used to define the track width. In general, fabrication of a contiguous junction (CJ) involves etching out the CPP sensor (TMR or GMR) by the IBE process to designed TW and junction angle. Subsequently, a thin insulator and permanent magnetic film are deposited along the TW direction to stabilize the sensor. For a robust product performance, the TW dimension as well as the sidewall (junction) angle sigmas have to be tightly controlled.

In current fabrication processes, TW and junction angle sigmas are relatively large. One contributing factor for these variations is the beam steering/divergence associated with the IBE process. Another important contributing factor is the stability of the photoresist used for patterning. Another approach involves using a reactive ion etch (RIE) process used to get junction profiles without the in-board/outboard asymmetry normally associated with the IBE processes and their characteristic beam steering/divergence. The use of the RIE process can significantly reduce the junction angle sigma compared with the IBE process. Also, the TW sigma is expected to be reduced due to the use of tantalum (Ta) hard mask instead of a photoresist.

Recently, a new magnetic RIE process has been introduced that is specifically aimed at etching of magnetic multilayer structures. In this RIE process, an etch-stop layer 120 made of pure Ta with a thickness greater than 30 Å is put at the bottom of a sensor stack (comprising a bottom sensor layer 130, a barrier layer 140, free layers 150, 160, and a capping layer 170) in order to achieve a flat etching profile as shown in FIG. 1A.

However, the shield-to-shield spacing is reduced, the current AFM seed layer used in MgO TMR sensors is changed to CoFeB/NiFe magnetic seed layer, which is not effective as RIE etch-stop layer when using $CH_3OH$ etchant gas, for example. This gives rise to the formation of skirts 105 at the bottom of the sensor stack as shown in FIG. 1B. The formation of the skirts 105 is not desirable, as they hamper a good alignment between the free layer of the sensor and the hard bias used for stabilization.

SUMMARY OF THE INVENTION

Various embodiments of the subject disclosure overcome the foregoing limitations by providing a novel magnetic etch-stop layer having a soft magnetic property and yet acting as an effective etch-stop layer. As will become evident from the subject disclosure, the use of such a magnetic etch-stop layer has a number of advantages including reducing the shield-to-shield spacing, reducing TW and junction angle sigmas, and providing an effective etch-stop layer for RIE process.

According to one embodiment of the subject disclosure, a method of producing a magnetoresistive read head is disclosed. The method can comprise providing a shield layer. The method can further comprise forming a magnetic etch-stop layer over the shield layer. The magnetic etch-stop layer can comprise a nonmagnetic metal and a soft magnetic material. The method can further comprise forming a sensor stack over the magnetic etch-stop layer. The method can further comprise forming a patterned mask layer over the sensor stack. The method can further comprise removing material from a portion of the sensor stack not covered by the patterned mask.

According to one embodiment of the subject disclosure, a tunneling magnetoresistive read head is disclosed. The tunneling magnetoresistive read head can comprise a shield layer. The tunneling magnetoresistive read head can further comprise a magnetic etch-stop layer disposed over the shield layer, the magnetic etch-stop layer comprising a nonmagnetic metal and a soft magnetic material. The tunneling magnetoresistive read head can further comprise a patterned sensor stack disposed over the magnetic etch-stop layer.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

FIG. 2 is a flowchart illustrating an exemplary process for producing magnetoresistive sensors (e.g., TMR or GMR sensors) by the use of a magnetic etch-stop layer according to one aspect of the subject disclosure.

FIG. 3A is a diagram depicting an exemplary pre-etch TMR structure according to one aspect of the subject disclosure.

FIG. 3B is a diagram depicting an exemplary post-etch TMR structure according to one aspect of the subject disclosure.

FIG. 4A is a diagram depicting an exemplary alloyed magnetic etch-stop layer according to one aspect of the subject disclosure.

FIG. 4B is a diagram depicting an exemplary multilayered magnetic etch-stop layer according to one aspect of the subject disclosure.

DETAILED DESCRIPTION OF THE INVENTION

Figures 1, 1A, 1B:
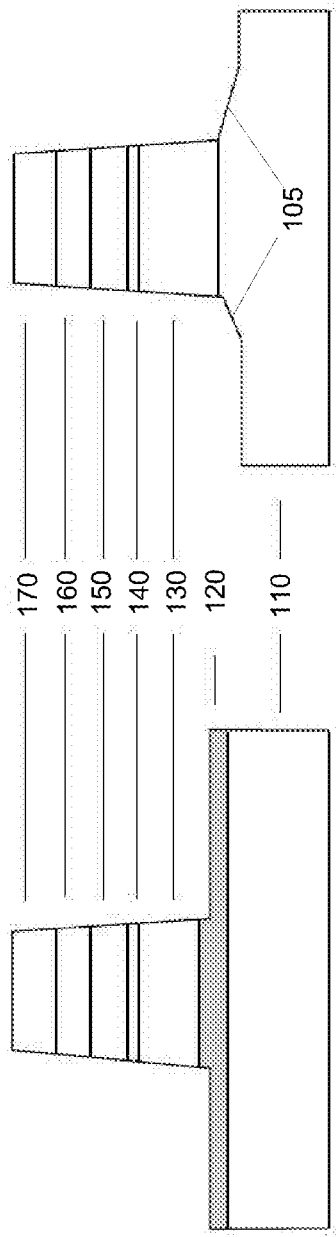
FIG. 1A is a diagram depicting a prior art TMR sensor structure produced via an RIE process using Ta as the etch-stop layer.
FIG. 1B is a diagram depicting a prior art TMR sensor structure produced via an RIE process using a magnetic seed layer such as CoFeB/NiFe as the etch-stop layer.

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

FIG. 2 is a flowchart illustrating an exemplary process 200 for producing magnetoresistive sensors (e.g., TMR or GMR sensors) using a magnetic etch-stop layer according to one aspect of the subject disclosure. The process 200 will be described with respect to exemplary pre-etch and post-etch TMR sensor structures 300A, 300B before and after RIE etching process, respectively, as shown in FIGS. 3A and 3B. The TMR sensor structures 300A and 300B comprise a bottom shield layer 310, a magnetic etch-stop layer 320 disposed over the bottom shield layer 310, a seed layer 325 disposed over the magnetic etch-stop layer 320, and a sensor stack 302 disposed over the seed layer 325. In certain embodiments, the seed layer 325 is configured to be magnetic to ensure a narrow shield-to-shield magnetic spacing. The sensor stack 302 comprises a bottom sensor layer 330, a barrier layer 340, a first free layer 350 and a second free layer 360, and a capping layer 370. In certain embodiments, the bottom sensor layer 330 can comprise a plurality of magnetic layers including a pinning or antiferromagnetic (AFM) layer, a reference layer, and/or a pinned layer.

It shall be appreciated by those skilled in the art in view of the subject disclosure that references to various elements of the TMR sensor structures 300A and 300B are for illustration purposes only, and various embodiments and methodologies of the subject disclosure can be applied to other types of TMR or other magnetoresistive sensor structures. For example, although FIGS. 3A and B depict a current-perpendicular-to plane (CPP) TMR head, those skilled in the art will understand that various embodiments and methodologies of the subject disclosure can be applied to CPP GMR, current-confined path (CCP) GMR devices, or to multilayer sensor designs based on any other magnetoresistance (MR) effect.

The process 200 begins at operation 210, in which the bottom shield layer 310 is provided. The bottom shield layer 310 comprises a soft magnetic material such as NiFe permalloy.

The process 200 proceeds to operation 220, in which the magnetic etch-stop layer 320 is formed over the bottom-shield layer 310. As indicated above, the magnetic etch-stop layer 320 has a soft-magnetic property (e.g., having a magnetic permeability greater than 7000) and is also effective as an RIE etch-stop layer having an etching selectivity with respect to a seed layer material. In certain embodiments, the magnetic etch-stop layer 320 comprises a nonmagnetic metal that provides the etching selectivity and a soft magnetic material that provides the soft magnetic property for the etch-stop layer. In some embodiments, the magnetic etch-stop layer 320 comprises an amorphous soft magnetic material to prevent any effect of S1 shield from transferring to the structure of the crystalline magnetic seed layer formed thereon.

FIGS. 4A and 4B show two exemplary embodiments of magnetic etch-stop layer: an alloyed magnetic etch-stop layer 320A and a multilayered magnetic etch-stop layer 320B. The alloyed magnetic etch-stop layer 320A comprises an alloy or a mixture of at least one nonmagnetic metal and at least one soft magnetic material. The soft magnetic metal can comprise one or more of cobalt (Co), nickel (Ni), and iron (Fe). In certain embodiments, the nonmagnetic metal is Ta, and the soft magnetic material comprises an alloy of cobalt iron boron (CoFeB). However, the nonmagnetic metal can comprise one or more of other heavy metals such as chromium (Cr) and zirconium (Zr) in place of or in addition to Ta, and the soft magnetic material can comprise one or more of other soft magnetic materials including, but not limited to Ni, Fe, NiFe, and CoFe, in place of or in addition to CoFeB. In some embodiments, the alloyed magnetic etch-stop layer may be CoFeTa, NiFeTa, CoFeCr, NiFeCr, CoFeZr, or NiFeZr. In certain embodiments, the nonmagnetic metal comprises between about 10 to about 40 weight percent of the alloyed magnetic etch-stop layer 320A. Preferably, the nonmagnetic metal comprises between about 10 to about 25 weight % of the alloyed magnetic etch-stop layer.

The multilayered magnetic etch-stop layer 320B (FIG. 4) comprises a set of alternating layers of a nonmagnetic metal 322B and a soft magnetic material 344B. In certain embodiments, the nonmagnetic metal 322B is Ta, and the soft magnetic material 344B is CoFeB. In other embodiments, one or more of other heavy metals such Cr and Zr can be used in place of or in addition to Ta, and one or more of other soft magnetic materials including, but not limited to, Ni, Fe, NiFe, and CoFe, can be used in place of or in addition to CoFeB. In one particular embodiment, the multilayered magnetic etch-stop layer 320B constitutes a multilayer [CoFe/Ta]×N, where N is the number of CoFe—Ta layer combinations and can range from 2 to 10.

In certain embodiments, the nonmagnetic metal comprises between about 10 to about 40 weight percent of the multilayered magnetic etch-stop layer 320B. Preferably, the nonmagnetic metal comprises between about 10 to about 25 weight percent of the multilayered magnetic etch-stop layer 320B. In some embodiments, each of the layers comprising the nonmagnetic metal 322B has a thickness of between about 2 Å to about 8 Å. Where the magnetic etch-stop layer 320 employed is a multilayered magnetic etch-stop layer (e.g., 320B of FIG. 4B), the operation 220 includes alternating depositions of the nonmagnetic metal and the soft magnetic material. The deposition of the nonmagnetic metal can be performed, for example, by physical vapor deposition (PVD) process. The deposition of the soft magnetic material can be performed, for example, by PVD.

The process 200 proceeds to operation 230, in which the seed layer 325 is formed over the magnetic etch-stop layer 320 (FIG. 3). As indicated above, in certain embodiments, the seed layer 325 is configured to be magnetic. The magnetic seed layer 325 can comprise NiFe, CoFe, CoFe/NiFe and can have a thickness in the range of 20-100 Å. In certain embodiments, the magnetic seed material has a crystalline structure.

The process 200 proceeds to operation 240, in which the sensor stack 302 is formed over the seed layer 325 to arrive at the pre-etch TMR sensor structure 300A. In the illustrated example, as indicated above, the sensor stack 302 comprises the bottom sensor layer 330, the barrier layer 340, the first free layer 350, the second free layer 360, and the capping layer 370. In certain embodiments, the bottom sensor layer 330 comprises an pinning or antiferromagnetic (AFM) layer, a reference layer disposed over the AFM layer, and a pinned layer disposed over the reference layer. In some embodiments, the barrier layer 340 comprises a crystalline magnesium oxide (MgO). In addition, although not shown in FIGS. 3A and B, the crystalline MgO tunnel barrier 340 can include a thin Mg or Zn layer between the bottom sensor layer 330 and the MgO in the barrier layer 340. The capping layer 370 can be formed of materials such as Ta, Ru, Ta/Ru, Ru/Ta, Ta/Ru/Ta or Ru/Ta/Ru. In some embodiments, the first free layer 350 includes an alloy of cobalt and iron (CoFe), and the second free layer 360 includes an alloy of nickel and iron (NiFe).

In certain embodiments, a thin (e.g., 10 Å) non-magnetic metal such as Ru (not shown) is inserted between an AFM material disposed at the bottom of the bottom sensor layer 330 and the magnetic seed layer 325 to provide a magnetic isolation therebetween. Methods of depositions for various layers of the sensor stack 302 are known in the art and not repeated here for the sake of brevity.

The process 200 proceeds to operation 250, in which a patterned mask is formed over the pre-etch TMR structure 300A (FIG. 3). This can be accomplished, for example, by depositing and patterning a bottom anti-reflection coating (BARC) and photoresist over the sensor stack 302. Alternatively, a hard metal such as Ta can be deposited underneath the BARC and photoresist and patterned to form a patterned hard mask.

The process 200 proceeds to operation 260, in which material from a portion of the sensor stack 302 is removed by an etching process. The removal operation, for example, can remove the portion not covered by the patterned mask. In certain embodiments, the etching process is a reactive ion etching (RIE) process. The RIE process can employ an etchant gas including, but not limited to, $CH_3OH$, $C_2H_5OH$ or $CO/NH_3$. Alternatively, a two-step etching process is performed, by first etching the BARC and Ta using a fluorine containing gas, such as $CF_4$ or $CHF_3$, followed by magnetic layer etching using $CH_3OH$ as etchant gas.

The process 200 proceeds to and ends after operation 270, in which the removal operation begun at the operation 260 is stopped after exposing the magnetic etch-stop layer 320 to arrive at the post-etch TMR structure 300B shown in FIG. 3B. As illustrated by the TMR structure 300B, the RIE process is stopped after removing a top portion of exposed portion 304 of the magnetic etch stop layer 320, making the exposed portion 304 slightly (e.g., 30 Å) below unexposed portion 306 of the magnetic etch-stop layer 320. The exposed portion 304 of the magnetic etch stop layer 320 remains with the TMR sensor structure as part of the bottom shield owing to its soft magnetic property. Furthermore, the resulting TMR structure 300B can have a junction angle 308 in the range of between about 50 to about 90 degrees. Due to the flatness (e.g., lack of skirts) of the exposed portion 304, a low sigma value for the junction angle 308 can be achieved.

It shall be appreciated by those skilled in the art in view of the subject disclosure that various compositions and arrangements for the magnetic etch-stop layer 320 can be advantageously employed to provide an etching selectivity over a material comprising the seed layer 325. For example, Table 1 shows experimentally-determined selectivity data for certain magnetic etch-stop layers (1 and 2) and a nonmagnetic etch-stop layer (3) with respect to certain proposed seed layer materials.

TABLE 1

| Etch-stop layer | Etching Rate [Å/min] | Selectivity to IrMn, CoFeB | Selectivity to NiFe |
|---|---|---|---|
| 1  [CoFeB(3 Å)/Ta(2 Å)] × 10 | 46 | ~4 | ~10 |
| 2  [CoFeB(12 Å)/Ta(2 Å)] × 10 | 84 | 1.5 | ~5 |
| 3  Ta(50 Å) | 30 | ~4 | ~15 |

For example, the magnetic etch-stop layer 1 comprising a stack of 10 repeated CoFeB(3 Å)/Ta(2 Å) layer combinations provides an etching selectivity almost as high as the conventional nonmagnetic etch-stop layer Ta and yet possesses a soft magnetic property that allows the magnetic etch-stop layer to become part of the bottom shield, thereby reducing the overall shield-to-shield spacing for the TMR sensor.

Figures 5A, 5B:
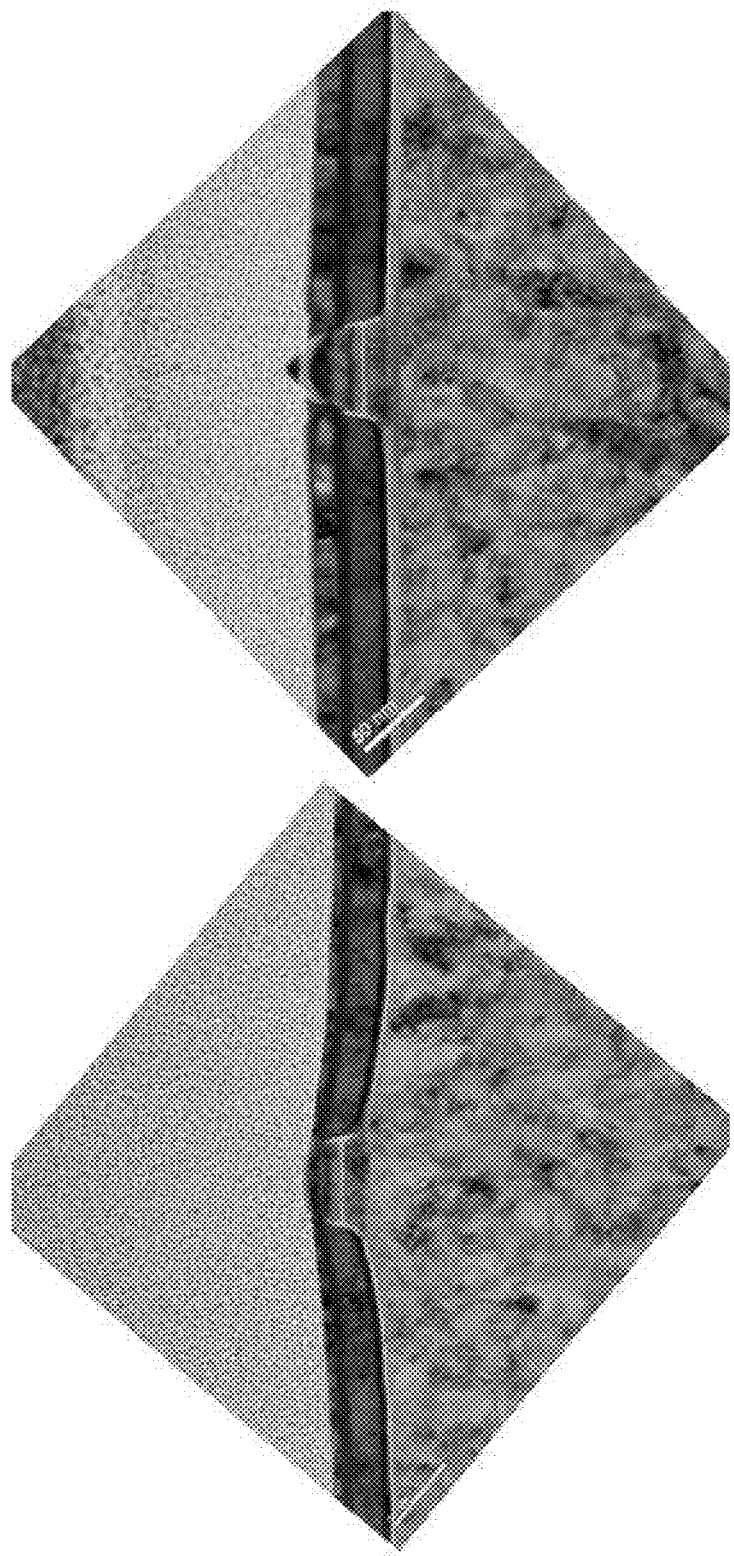
FIG. 5A is a TEM image of a post-etch TMR structure produced via RIE process using a conventional magnetic seed layer acting as an etch-stop layer.
FIG. 5B is a TEM image of a post-etch TMR structure produced via RIE process using a multilayered magnetic etch-stop layer according to one aspect of the subject disclosure.

FIG. 5A is a tunneling electron microscope (TEM) image of a post-etch TMR structure produced via RIE process using a conventional magnetic seed layer acting as an etch-stop layer. FIG. 5B is a TEM image of a post-etch TMR structure produced via RIE process using a multilayered magnetic etch-stop layer (e.g., the magnetic etch-stop layer 1 of Table 1) according to one aspect of the subject disclosure. A comparison of TEM images of FIGS. 5A and 5B demonstrates that the use of the magnetic etch-stop layer of the subject disclosure reduces or eliminates skirts that would have been formed at the outside bottom of the TMR junction if conventional magnetic seed layer were used. The use of the magnetic etch-stop layer according to the subject disclosure also helps to achieve a superior TW and junction angle sigmas. Additionally, the use of the magnetic etch-stop layer according to the subject disclosure also helps to achieve a narrower overall shield-to-shield spacing by the fact that the etch-stop layer can become a part of the bottom shield by the virtue of the layer having a soft magnetic property.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of producing a magnetoresistive read head, the method comprising:
    providing a shield layer;
    forming a magnetic etch-stop layer over the shield layer, the magnetic etch-stop layer comprising a nonmagnetic metal and a soft magnetic material;
    forming a sensor stack over the magnetic etch-stop layer;
    forming a patterned mask layer over the sensor stack; and
    removing material from a portion of the sensor stack not covered by the patterned mask.

2. The method of claim 1, wherein the magnetic etch-stop layer comprises an amorphous magnetic material.

3. The method of claim 1, further comprising forming a magnetic seed layer between the magnetic etch-stop layer and the sensor stack.

4. The method of claim 3, wherein the magnetic seed layer comprises a crystalline magnetic material.

5. The method of claim 1, wherein forming the magnetic etch-stop layer comprises depositing an alloy of the nonmagnetic metal and the soft magnetic material.

6. The method of claim 1, wherein forming the magnetic etch-stop layer comprises depositing a set of alternating layers of the nonmagnetic metal and the soft magnetic material.

7. The method of claim 1, wherein the removing comprises performing an etching process.

8. The method of claim 7, wherein the etching process is stopped after exposing the magnetic etch-stop layer.

9. The method of claim 7, wherein the etching process comprises a reactive ion etching process.

10. The method of claim 9, wherein the reactive ion etching process employs $CH_3OH$, $C_2H_5OH$, or $CO/NH_3$ as an etchant gas.

11. The method of claim 1, wherein the patterned mask layer comprises a hard mask layer.

\* \* \* \* \*